United States Patent [19]

Squier

[11] Patent Number: 4,846,451

[45] Date of Patent: Jul. 11, 1989

[54] MOVABLE VEHICULAR ENGINE SUPPORT

[76] Inventor: Donald M. Squier, 51 Back River Rd., #10, Dover, N.H. 03820

[21] Appl. No.: 95,528

[22] Filed: Sep. 10, 1987

[51] Int. Cl.4 ............ B23Q 3/00

[52] U.S. Cl. ............ 269/17

[58] Field of Search ............ 254/2 B, 133 R, 133 A, 254/134, DIG. 16; 269/17, 296

[56] References Cited

U.S. PATENT DOCUMENTS

| | | | |
|---|---|---|---|
| 3,059,785 | 10/1962 | Buckeye | 214/1 |
| 4,021,017 | 5/1977 | Adams | 254/8 |
| 4,099,634 | 7/1978 | McIntire et al. | 214/86 |
| 4,307,877 | 12/1981 | Rogos | 269/46 |
| 4,383,681 | 5/1983 | Walters | 269/17 |
| 4,497,469 | 2/1985 | Barnhouse | 254/8 |
| 4,558,849 | 12/1985 | Luening et al. | 254/134 |

OTHER PUBLICATIONS

OTC Shop Equipment Bulletin, "Portable Lifting Equipment", 1987, pp. 83–84.

Ford Specialty Tool Catalog, "Drive Train Removal Lift", 1987, p. F25.

Black Hawk "FWD Engine/Drive Train Lift" catalog sheet 8–A, 1987.

Toyota Specialty Tool Catalog, "Engine Cradle", 1987, 3Y–E.

*Primary Examiner*—P. W. Echols

*Assistant Examiner*—Andrew E. Rawlins

*Attorney, Agent, or Firm*—Rines and Rines; Shapiro and Shapiro

[57] ABSTRACT

A portable engine removal structure having integral frame and supporting members for holding the trans-axle, engine, suspension and transmission systems as a unitary structure for facile removal from the vehicle and replacement therein.

9 Claims, 2 Drawing Sheets

MOVABLE VEHICULAR ENGINE SUPPORT

Figure 1:
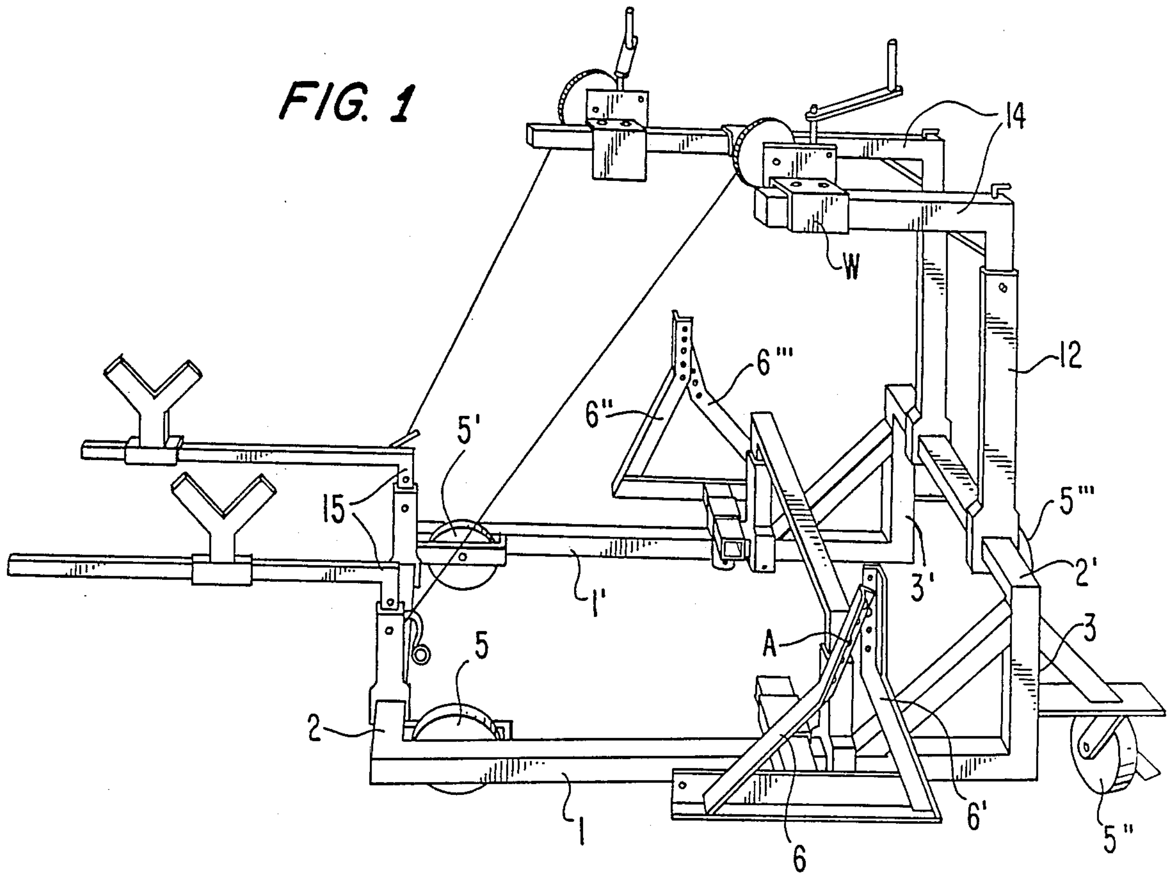

The present invention relates to movable support structures for enabling the facile removal of vehicular engines and the like from the vehicles, as for repair or other purposes, and for readily replacing the same; being more particularly directed to movable supports that do not require the disassembly of transmission, transaxle suspension or other components prior to removing the engine, or the use of support jacks or customary hydraulic lifting and other present-day portable lifting dollies and cradle handlers and the like.

While engines, transmission and transaxle structures are currently removable from vehicles with multiple equipments and steps, as by portable lifting dollies and cradle handlers and engine support bars (see, for example, OTC Shop Equipment Bulletin, "Portable Lifting Equipment", 1987, pp. 83 and 84, Ford Specialty Tool Catalog, "Drive Train Removal Lift", 1987, page F, Black Hawk "FWD Engine/Drive Train Lift" catalog sheet 8-A, 1987; and Toyota Specialty Tool Catalog, 1987, "Engine Cradle", 3Y-E), and prior patents have described engine handling booms (U.S. Pat. Nos. 3,059,785; 4,021,017; and 4,099,634) and transmission stands and strap supports (U.S. Pat. No. 4,307,877) and dollies and similar structures (U.S. Pat. Nos. 4,383,681, 4,497,469 and 4,558,849), such conventional means of disassembly usually have dictated separation of engine and transmission or engine and transmission/transaxle, and lifting the engine out of the vehicle. From this point, transmission/transaxle suspension components were removed separately as warranted. The increasing complexity and diminutive space accorded unibody vehicular power plants, however, has made complete drive-train removal necessary to facilitate repair operations, both in the autobody and mechanical fields.

When the vehicle is manufactured, the engine, transmission, suspension and components are assembled as a unit and installed from below. Very often, far fewer bolts are required to remove a complete drive-train-suspension-wheel hub unitary assembly, than to disassemble by parts. This is frequently not done, however, due to the difficulties inherent with the procedures that are encountered once the assembly is removed. The obdurate mass of engine-transmission-transaxle suspension, and wheel hubs, furthermore, usually requires two or more individuals to effect the removal, and often multiple equipments, as before delineated. Reinstallation is even more difficult.

To facilitate this end, certain vehicles are manufactured with a square or flat "sub frame", that holds the drivetrain and suspension components, requiring the use of a flat box that can be raised hydraulically to support the assembly. Often, only the friction of the assembly on the box and a strap hold the unit to the box. The wheel hubs hang in positions that are improper to facilitate reinstallation. The bottom of the drivetrain is inaccessible. Access is gained only by disassembly and mounting to a stand, or by hanging from a chain. The former procedure, moreover, requires additional time; while the latter procedure has very little factor of safety.

While adaptors are available for jacks and transmission jacks to support the unitary assembly at the center, the shifting of any of the components can significantly alter the center of gravity of the unitary assembly, causing undesirable moments about the support base. Here again, access to the bottom of the unitary assembly is either impossible or limited. Since some units are of substantial height, the danger of slippage is high.

A common limitation for these prior devices, furthermore, is that they are only adapted for front wheel drive vehicles, most, indeed, being merely adaptors that attach to existing hydraulic jack equipment.

An object of the present invention, accordingly, is to obviate these and other disadvantages of prior art engine removal and replacement techniques and equipments and to provide, to the contrary, a new and improved engine assembly removal and replacement support and method that enable handling the total unitary engine-transmission-suspension-adjacent transaxle-wheel hub structure and without disassembly or separate pieces of handling equipment, and by only a single operator.

A further object is to provide such a novel portable support that is independent of other equipment and is adapted to support by itself the weight of desired front or rear axles, drivetrain assembly, or front or rear of the vehicle, is void of hydraulics, and provides ready access to the bottom of the drivetrain, as well.

Other and further objects will be explained hereinafter and are more particularly pointed out in the appended claims.

In summary, however, from one of its important viewpoints, the invention embraces an engine-transmission-suspension-adjacent transaxle-wheel hub removal support having, in combination, a rigid base frame composed of longitudinal and transverse frame members and having forward and rearward pairs of wheels for moving the frame over but close to the ground, with the latter pair of wheels pivotally mounted to enable orienting the frame under an engine-containing vehicle when in wheel-jacked position, and with the transverse width of the frame corresponding substantially to the width of the vehicle between its wheel hubs at the ends of the wheel axle; a pair of similar yoke members secured to opposite corresponding regions of the longitudinal members of the frame and each comprising a pair of adjacent upwardly extending support arms spaced longitudinally a distance corresponding to the separation of opposing wheel hub bolt apertures and between which the hub axle regions of the wheel axle may be received, said arms having bolt apertures for receiving the hub wheel bolts to secure the hubs and axle and engine components attached thereto rigidly transversely between said pairs of arms and above and intermediate the longitudinal base frame; and stanchion means upwardly extending from a transverse frame member and provided with bracket means extending therefrom inwardly of the frame from which a winch cable and the like may depend to provide suspending support for the engine. Preferred and best mode embodiment details are later presented.

Figure 2:
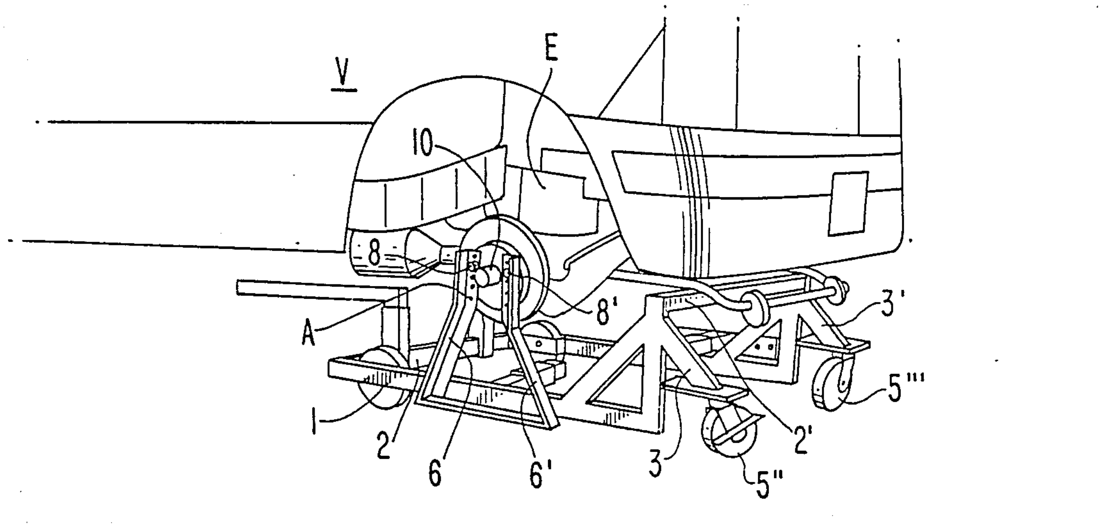
Figure 3:
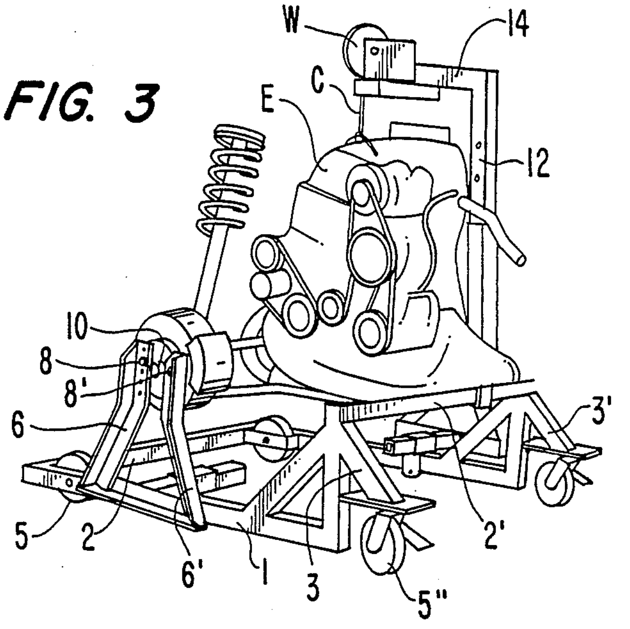
Figure 4:
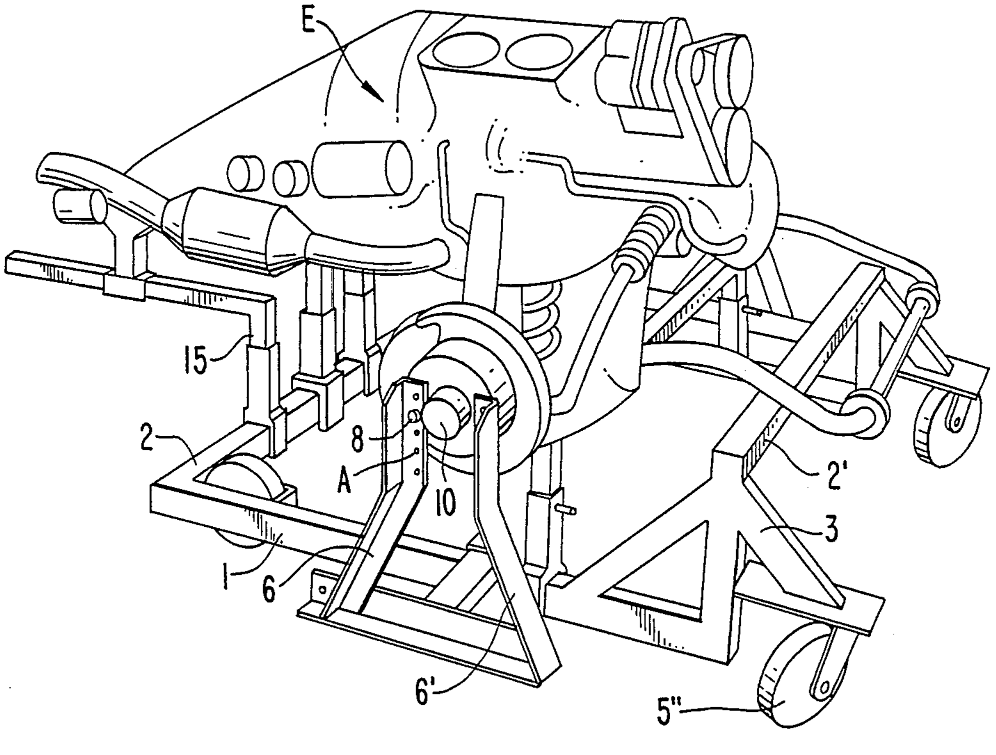

The invention will now be described with reference to the accompanying drawings, FIG. 1 of which is an isometric illustration of the apparatus for practicing the technique of the invention, in preferred form; and FIGS. 2, 3 and 4, are views of the apparatus of FIG. 1 in exemplary use.

The portable support of the invention comprises a substantially rectangular base frame as of parallel longitudinally extending tubular frame members 1, 1' transversely connected at the front and rear ends with cross tubular frame members 2, 2', the latter of which is elevated vertically above the frame by the braced vertical supports 3, 3'. The base frame is rollable on coasters or wheels, being maintained near the ground or surface over which it is to be moved. The front pair of wheels, 5, 5' is shown with the wheels mounted near the inner forward ends of the longitudinal frame members 1, 1' to rotate behind the forward transverse frame member 2 within and/or below the base frame; and the rear pair of coasters 5'', 5''' is shown mounted from the elevated rear transverse frame member 2' rearward of the same and with pivotal mountings to enable facile positioning and orienting of the support.

Forward of the rear transverse frame member 2', at adjustable selectable corresponding regions along the longitudinal frame members 1, 1', upwardly extending support yokes are positioned, each comprising a pair of respective support arms 6–6' and 6''–6'''. The arms of each yoke are spaced or spaceable longitudinally to accomodate between same the ends of the transaxle 10 of, for example, the forward wheels of the vehicle when jacked up so that the frame may be rolled under the engine E, FIG. 2. The yoke arms are provided with multiple apertures A (for position adjustment) separated by the separation of opposing wheel hub bolt apertures so as to enable attachment to the wheel hubs after removal of the wheels; as shown at 8 and 8' in FIGS. 2, 3 and 4. The preferred, though not essential, construction of the yoke arms 6–6', etc. is illustrated as diverging toward one another and then extending parallely vertically upward.

One or more vertical stanchions 12 are provided supported from the rear transverse frame member 2' and adjustable transversely therealong and in vertical height, as required. Brackets 14 are shown extending inward (forward) of the frame from the rear transverse frame member 2' at adjustable heights above the whole engine area, and over the regions of the yokes, as required, and carrying support winches W the cables C of which provide suspension support of the engine-transmission-suspension-transaxle-wheel hub unitary structure.

Further stanchion(s) 15 may be provided as at adjustable transverse positions of the forward transverse frame member 2 of adjustable vertical height and with additional brackets and support mechanisms, as shown, to provide additional support for various structures and also to permit parts that may be separated to be suspended or supported while repairs or other adjustments or replacements are underway.

The support structure 1–1', 2–2', 6–6', 6''–6'', etc., thus serves as an independent support system for the unitary assembly of engine, transmission/transaxle and drive shafts, suspension and wheel hubs of unibody vehicles, front, mid, and rear engine designation, front and rear wheel drive. The tubular frame construction permits ready attachment of the support arms and adjustability of the vertical stanchions mounted at the ends of the frame.

In operation, the vehicle V is raised, say at the front end, FIG. 2, and prepared for disassembly by removing the two front wheels. Necessary operations are then performed, such as drive shaft removal (rear wheel drive), radiator draining, wires and linkages disconnected, and whatever else is pertinent to removing the engine, transmission, suspension and wheel hub assemblies. The base of the stand is rolled under the vehicle. The adjustable yoke arms are bolted to the vehicle hubs, as before explained, FIGS. 2 and 3, and the supporting arms are fastened to the stand. Depending on the vehicle construction, different means of additional support are required. If there is limited space between the front of the engine and the front of the vehicle engine compartment, then the adjustable arms cannot be placed inside the vehicle engine compartment, the small stanchions and small arms may be placed at optimum support points and fastened.

Many vehicles have enough space to place one or more of the larger stanchions inside the engine compartment, just in front of the engine, as shown. Most front-wheel drive engines are mounted transversely so that the stanchion arms 12–14 reach over the engine without adjustment. In a rear wheel drive, however, the engine is mounted axially, thus requiring a longer reach, so the arms may be extended over the engine. The arm brackets are fastened at preferred attachment points with the winches W mounted thereon and the cable C is hooked to the engine E, FIG. 3. One arm can be used, but two are preferred, both from a safety standpoint and for ease of installation. Both winches W shown in FIG. 1 can be operated independently, thus helping to realign the engine with the engine mounts. At this point, the vehicle is resting on the stand with the drive components supported.

The remaining engine mounting bolts of the unitary assembly may then be removed or released and the vehicle lifted off the stand. The stand is then rolled away for the repair or other operation, with more stability than conventional methods and with greater safety and ease of mobility.

If necessary, moreover, a common floor jack can be used, without any modifications, to facilitate removal and installation; and, of course, the stand itself can be used as a dolly to move the vehicle in the repair area, with the stanchions and attaching arms used with vertical adjustability to hold components while mechanical operations are performed. As before indicated, the system is designed for front wheel drive, rear wheel drive four, five, six or eight cylinder engines, particularly, providing a very safe, secure, method of removal; a panacea for prior unibody drivetrain removal woes.

Further modifications will also occur to those skilled in this art and such are considered to fall within the spirit and scope of the invention as defined in the appended claims.

What is claimed is:

1. An engine-transmission-suspension wheel axle wheel hub removal support having, in combination, a rigid base frame composed of longitudinal and transverse frame members and having forward and rearward pairs of wheels for moving the frame over but close to the ground, with the rearward pair of wheels pivotally mounted to enable orienting the frame under an engine-containing vehicle when in a wheel-jacked position, and with the transverse width of the frame corresponding substantially to the width of the vehicle between its wheel hubs at the ends of the wheel axle, each wheel hub having hub bolts; a pair of similar yoke members secured to opposite corresponding regions of the longitudinal members of the frame and each yoke member comprising a pair of adjacent upwardly extending support arms spaced longitudinally a distance corresponding to the separation of opposing wheel hub bolts and between which the hub axle regions of the wheel axle may be received, said arms having bolt apertures for receiving the wheel hub bolts to secure the hubs and axle and engine components attached thereto rigidly transversely between said pairs of arms and above and intermediate the base frame; and stanchion means upwardly extending from a transverse frame member and provided with bracket means extending therefrom inwardly of the frame from which a winch cable and the like may depend to provide suspending support for the engine.

2. A support as claimed in claim 1 and in which the yoke arms are adjustable and with multiple apertures to accommodate for different vehicles.

3. A support as claimed in claim 2 and in which said stanchion means are adjustable in height and transverse positioning to accomodate for different vehicles and parts.

4. A support as claimed in claim 1 and in which the said stanchion means is secured to a transverse base frame member disposed at the rear end of the frame mounting the pivotal rearward wheels and its bracket means extends forwardly over a region between the yoke members.

5. A support as claimed in claim 4 and in which said stanchion means comprises a pair of vertical stanchions spaced transversely along said transverse base frame member.

6. A support as claimed in claim 4 and in which said rear end transverse base frame member is secured elevated above the longitudinal frame base members.

7. A support as claimed in claim 6 and in which said pivotal rearward wheels are mounted from brackets extending rearwardly of said rear end transverse base frame member.

8. A support as claimed in claim 7 and in which the wheels of the front pair of base frame wheels are mounted near the corresponding forward inside ends of the base frame longitudinal members.

9. A support as claimed in claim 4 and in which further adjustable stanchion and support means are provided extending upwardly from and intermediate a front transverse base frame member.

* * * * *